(12) United States Patent
King et al.

(10) Patent No.: US 8,527,558 B2
(45) Date of Patent: Sep. 3, 2013

(54) DISTRIBUTED GARBAGE COLLECTION

(75) Inventors: Stefan Merrill King, Belmont, MA (US); David Kopper, Shrewsbury, MA (US)

(73) Assignee: Sepation, Inc., Marlborough, MA (US)

( * ) Notice: Subject to any disclaimer, the term of this patent is extended or adjusted under 35 U.S.C. 154(b) by 318 days.

(21) Appl. No.: 12/882,885

(22) Filed: Sep. 15, 2010

(65) Prior Publication Data
US 2012/0066193 A1 Mar. 15, 2012

(51) Int. Cl.
*G06F 12/00* (2006.01)
*G06F 17/30* (2006.01)

(52) U.S. Cl.
USPC .......................................... 707/813

(58) Field of Classification Search
USPC .......................... 707/813, 999.206
See application file for complete search history.

(56) References Cited

U.S. PATENT DOCUMENTS

| | | | |
|---|---|---|---|
| 5,765,174 A * | 6/1998 | Bishop .................................. | 1/1 |
| 5,832,529 A | 11/1998 | Wollrath et al. | |
| 5,970,087 A | 10/1999 | Itoh | |
| 5,991,779 A | 11/1999 | Bejar | |
| 6,363,403 B1 | 3/2002 | Roy et al. | |
| 6,415,302 B1 | 7/2002 | Garthwaite et al. | |
| 6,611,858 B1 | 8/2003 | Aravamudan et al. | |
| 6,961,740 B2 | 11/2005 | O'Connor et al. | |
| 7,024,427 B2 | 4/2006 | Bobbitt et al. | |
| 7,310,655 B2 | 12/2007 | Dussud | |
| 7,340,494 B1 | 3/2008 | Detlefs et al. | |
| 2002/0087590 A1 | 7/2002 | Bacon et al. | |
| 2009/0030958 A1 | 1/2009 | Garst, Jr. | |
| 2009/0327372 A1* | 12/2009 | Ylonen .......................... | 707/206 |
| 2011/0225214 A1* | 9/2011 | Guo .............................. | 707/813 |

OTHER PUBLICATIONS

"GC FAQ—draft" http://www.iecc.com/gclist/GC-faq.html. Screen capture of webpage as obtained from www.archive.org, reporting a publication date of Feb. 24, 1999.

* cited by examiner

*Primary Examiner* — Aleksandr Kerzhner
(74) *Attorney, Agent, or Firm* — Lando & Anastasi, LLP

(57) ABSTRACT

Described are computer-based methods and apparatuses, including computer program products, for garbage collection. A garbage collection data structure is provided for deleting unused data objects. One or more object identifiers are stored in a first data structure in the garbage collection data structure. Each object identifier represents a data object about to be created but not yet assigned any references from other data objects. The first data structure prevents the data object from being deleted during creation of the data object but before one or more references are created to the data object. Data indicative of one or more objects is stored in a second data structure in the garbage collection data structure. The data includes one or more object identifiers, each object identifier representing a created data object. The data also includes one or more references to created data objects.

20 Claims, 7 Drawing Sheets

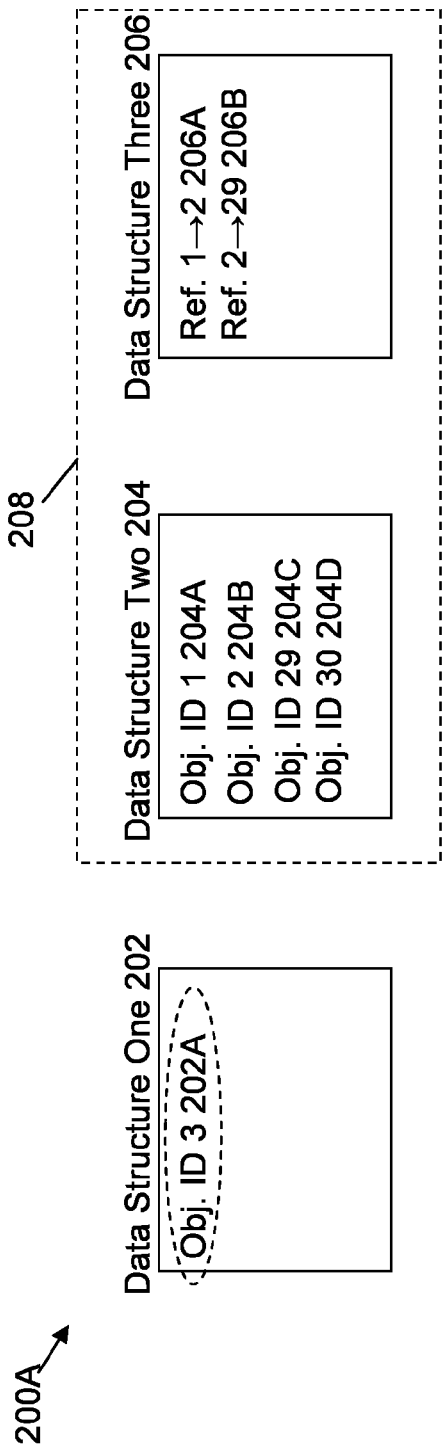
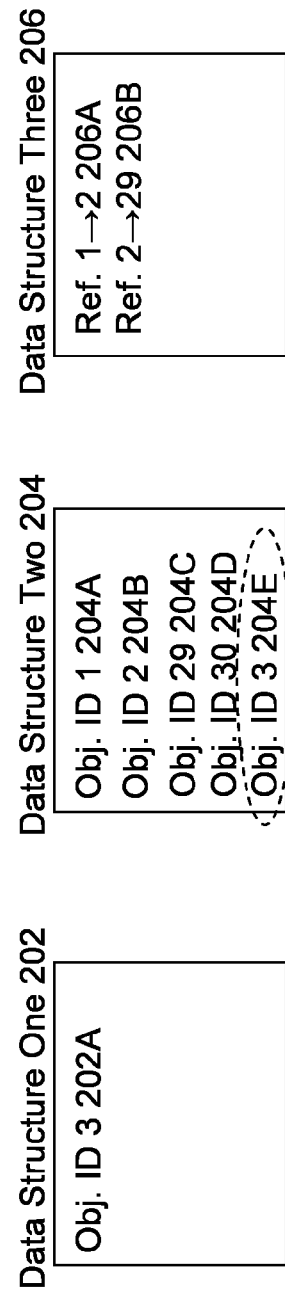
FIG. 2A
FIG. 2B

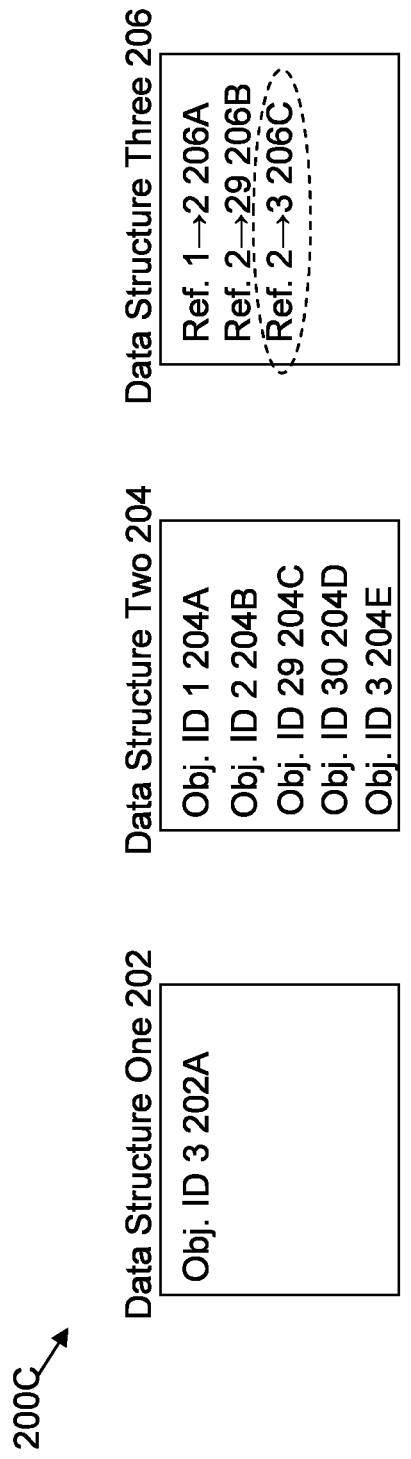
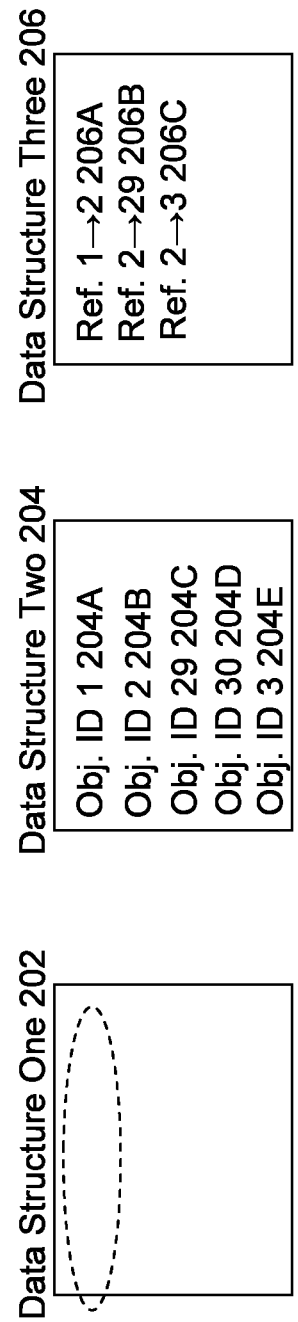
FIG. 2C
FIG. 2D

DISTRIBUTED GARBAGE COLLECTION

FIELD OF THE INVENTION

The present invention relates generally to computer-based methods and apparatuses, including computer program products, for distributed garbage collection.

BACKGROUND

Garbage collection refers to the process of reclaiming allocated memory (e.g., in Random Access Memory ("RAM"), hard disk space, etc.) that a program is no longer using. Such unused memory is "garbage" to a program because, unless reclaimed, the program cannot use the memory. Therefore, the goal of garbage collection is to identify memory that cannot be accessed in the future, and to reclaim those resources so the system can later use the memory as needed. Otherwise, programs would eventually run out of memory, resulting in poor system utilization and performance.

Garbage collection is a form of automatic memory management, where allocated memory should be reclaimed automatically once it can no longer be accessed by the program. Therefore, the challenge in automatic garbage collection programs often lies in properly identifying memory to reclaim. This challenge is further compounded for garbage collection routines in distributed systems. For solitary systems, garbage collection routines can relatively easily iterate through the system memory to identify and reclaim memory. However, garbage collection is often more complicated for distributed systems. Because distributed systems include a plurality of remotely located components (or systems), distributed systems rely on communication protocols to coordinate among the various components. Messaging between these components often creates bottlenecks, slowing down the garbage collection process. For example, if the distributed system includes a centralized memory that is accessed by a plurality of remote computers, it is often inefficient for the remote computers to communicate with the centralized memory itself to perform garbage collection.

Most garbage collection routines are lengthy and computationally expensive. Additionally, because garbage collection routines typically execute as separate threads (or entirely separate processes) from other applications, it can be difficult to predict when the garbage collection routine will execute relative to other programs. Therefore, the garbage collection process may improperly reclaim memory that will be accessed by other programs in the future.

SUMMARY OF THE INVENTION

Garbage collection processes can be implemented using distributed garbage collection data structures to ensure that, based on the distributed garbage collection data structures, only unused data objects are deleted (or reclaimed).

The invention, in one aspect, features a method for deleting unused data objects in a distributed computer system. The method includes providing, by a computer, a distributed garbage collection data structure for deleting unused data objects. The method includes storing, by the computer, one or more object identifiers in a first data structure in the garbage collection data structure, each object identifier representing a data object about to be created but not yet assigned any references from other data objects, wherein the first data structure prevents the data object from being deleted during creation of the data object but before one or more references are created to the data object. The method includes storing, by the computer, data indicative of one or more objects in a second data structure in the distributed garbage collection data structure. The data includes one or more object identifiers, each object identifier representing a created data object, and one or more references to created data objects.

The invention, in another aspect, features an apparatus for deleting unused data objects in a distributed computer system. The apparatus includes a memory configured to provide a distributed garbage collection data structure for deleting unused data objects. The apparatus includes a processor in communication with the memory configured to store one or more object identifiers in a first data structure in the garbage collection data structure, each object identifier representing a data object about to be created but not yet assigned any references from other data objects, wherein the first data structure prevents the data object from being deleted during creation of the data object but before one or more references are created to the data object. The processor is configured to store data indicative of one or more objects in a second data structure in the distributed garbage collection data structure. The data includes one or more object identifiers, each object identifier representing a created data object, and one or more references to created data objects.

The invention, in another aspect, features a computer program product, tangibly embodied in a non-transitory computer readable medium. The computer program product includes instructions being configured to cause a data processing apparatus to provide a distributed garbage collection data structure for deleting unused data objects. The computer program product includes instructions being configured to cause a data processing apparatus to store one or more object identifiers in a first data structure in the garbage collection data structure, each object identifier representing a data object about to be created but not yet assigned any references from other data objects, wherein the first data structure prevents the data object from being deleted during creation of the data object but before one or more references are created to the data object. The computer program product includes instructions being configured to cause a data processing apparatus to store data indicative of one or more objects in a second data structure in the distributed garbage collection data structure. The data includes one or more object identifiers, each object identifier representing a created data object, and one or more references to created data objects.

In other examples, any of the aspects above can include one or more of the following features. The second data structure can include a third data structure for storing the one or more object identifiers and a fourth data structure for storing the one or more references. A new data object can be created for a distributed system, including adding an object identifier for the new data object to the first data structure, creating the new data object, adding the object identifier to the second data structure to represent the created new object, creating a reference to the new data object, adding data indicative of the reference to the second data structure, and removing the object identifier for the new data object from the first data structure. A lock can be acquired for the new data object, wherein the lock prevents any other programs from manipulating the new data object, the reference to the new data object can be created, the data indicative of the reference to the second data structure can be added, and the lock for the new data object can be released.

In some examples, one or more unused data objects in a distributed system are deleted, including determining the one or more unused data objects based on the first data structure and the second data structure, and deleting the one or more unused data objects. A copy of the second data structure can be created, and the one or more unused data objects can be determined based on the first data structure and the copy of the second data structure. Determining the one or more unused data objects can include identifying a candidate object identifier representing a candidate data object for deletion in the second data structure, determining the candidate object identifier is being used, and not deleting the candidate data object. Determining if the candidate data object is being used can include determining at least one of (i) the candidate object identifier being in the first data structure or (ii) the second data structure includes one or more references to the candidate object.

In other examples, determining includes identifying a candidate object identifier representing a candidate data object for deletion, determining the candidate data object is an unused data object, and deleting the candidate data object. Determining the candidate data object is an unused object can include determining the candidate object identifier is not in the first data structure and the second data structure does not include one or more references to the candidate object. Deleting the candidate object can include acquiring a lock of the candidate data object, wherein the lock prevents any other programs from manipulating the new data object, deleting the candidate data object, removing the candidate object identifier from the second data structure, and releasing the lock of the candidate data object.

In some examples, the second data structure includes a third data structure for storing the one or more object identifiers and a fourth data structure for storing the one or more references. The processor is can be configured to create a new data object for a distributed system, including adding an object identifier for the new data object to the first data structure, creating the new data object, adding the object identifier to the second data structure to represent the created new object, creating a reference to the new data object, adding data indicative of the reference to the second data structure, and removing the object identifier for the new data object from the first data structure.

In other examples, the processor is further configured to delete one or more unused data objects in a distributed system including determining the one or more unused data objects based on the first data structure and the second data structure, and deleting the one or more unused data objects. Determining the one or more unused data objects can include identifying a candidate object identifier representing a candidate data object for deletion in the second data structure, determining the candidate object identifier is being used, and not deleting the candidate data object. Determining if the candidate data object is being used can include determining at least one of (i) the candidate object identifier being in the first data structure or (ii) the second data structure includes one or more references to the candidate object. Determining can include identifying a candidate object identifier representing a candidate data object for deletion, determining the candidate data object is an unused data object, and deleting the candidate data object. Determining the candidate data object is an unused object can include determining the candidate object identifier is not in the first data structure and the second data structure does not include one or more references to the candidate object.

The techniques, which include both methods and apparatuses, described herein can provide one or more of the following advantages. Both transient data and graph data for all of the data objects in the distributed system can be kept in a centralized data structure. Using the distributed garbage collection data structures, garbage collection can be implemented efficiently and reliably. The garbage collection routine can advantageously use these data structures to identify memory to reclaim, and to prevent reclamation of memory that will still be used by programs at a later time. Complete knowledge of memory space is not required, but rather the order of insertions into the distributed garbage collection data structures is sufficient to ensure reliable garbage collection. Furthermore, the data structures can be accessed by the various components of the distributed system, avoiding messaging bottlenecks. And the garbage collection process can be run concurrently with other system processes without pausing the other processes.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other aspects, features, and advantages of the present invention, as well as the invention itself, will be more fully understood from the following description of various embodiments, when read together with the accompanying drawings.

FIG. 2A is a block diagram of an exemplary distributed garbage collection data structure for deleting unused data objects according to the present invention;

FIG. 2B is a block diagram of an exemplary distributed garbage collection data structure for deleting unused data objects according to the present invention;

FIG. 2C is a block diagram of an exemplary distributed garbage collection data structure for deleting unused data objects according to the present invention;

FIG. 2D is a block diagram of an exemplary distributed garbage collection data structure for deleting unused data objects according to the present invention;

DETAILED DESCRIPTION

A distributed garbage collection data structure provides centrally located graph information for data objects in the distributed system. The distributed garbage collection data structure includes a transient data object list (e.g., data structure one) for storing unique object identifiers before they are added to the distributed system (e.g., to the centrally located data storage device). The distributed garbage collection data structure further includes a second data structure that stores information about the graph, including object identifiers for data objects in the distributed system and the relationship among those data objects. A garbage collection routine (or process) can use the distributed garbage collection data structure to ensure that only data objects appropriate for garbage collection are reclaimed.

The specification and/or figures describe(s) the techniques in terms of garbage collecting allocated memory. It is to be understood that the term "memory" is used in a broad sense. The term memory can include any type of data storage device, including but not limited to volatile memory (e.g., Random Access Memory (RAM), Static Random Access Memory (SRAM)), non-volatile memory (e.g., Flash memory, Read-Only Memory (ROM), Erasable Programmable Read-Only memory (EPROM)), and/or data storage devices (e.g., floppy disks, hard drives, magnetic tape data storage, and CDs). For example, the objects being garbage collected can temporarily reside in RAM only during the execution of a particular program, or the objects can reside in a hard disk and persist even after the termination of the program that created the objects.

Figure 1:
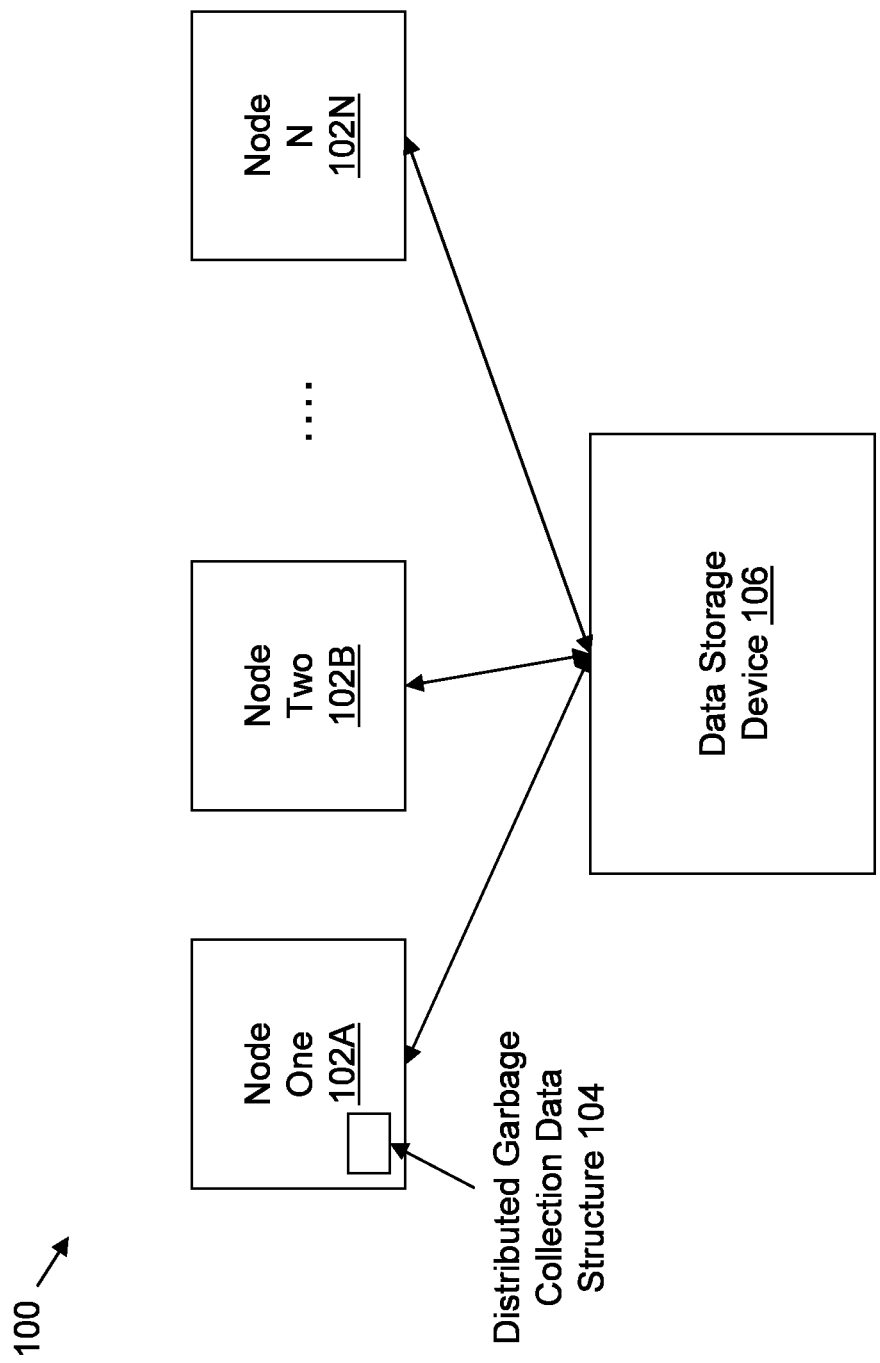
FIG. 1 is a block diagram of an exemplary distributed system according to the present invention.

FIG. 1 is a block diagram of an exemplary distributed system 100 according to the present invention. The distributed system 100 includes node one 102A, node two 102B through node N 102N (collectively "nodes 102"). The distributed system 100 can include any number of nodes 102 (e.g., one node, two nodes, or up to N nodes, where N is any whole number). Each node 102 is in communication with data storage 106. Node one 102A includes a distributed garbage collection data structure 104. While FIG. 1 shows the garbage collection data structure 104 residing in node one 102A, the garbage collection data structure 104 can reside on any node 102 (and/or the data storage 106).

The distributed system 100 (e.g., a networked computer environment) includes any computing environment in which a plurality of nodes 102 are connected to one or more shared data storage systems 106 in such a manner that the data storage device(s) 106 can communicate with each of the nodes 102. The nodes 102 can be any computer that has at least one processor, such as a personal computer (PC), a workstation, a mainframe, a networked client, a server, a media server, an application server, etc. that is capable of communication with other devices, such as a storage system or other node computers.

The nodes 102 can use the data storage device 106 as a central data store. For example, the nodes 102 can execute processes that store and manipulate data stored within the data storage 106. The nodes 102 can be coupled the to one or more data storage devices 106 via a storage area network (SAN). The data storage device 106 may be, for example, disk arrays such as are available from companies like EMC Corporation, IBM Corporation and others. Alternatively, a bus (not shown) or other network link may provide an interconnect between the nodes 102 and the data storage device 106. The bus and/or Fibre Channel network connection may operate using a protocol, such as the Small Component System Interconnect (SCSI) protocol, which dictates a format of packets transferred between the nodes 102 and the data storage device(s) 106.

Fibre Channel is one example of a communication network that may be used with embodiments of the present invention. However, it is to be appreciated that the networks described herein are not limited to Fibre Channel, and that the various network components may communicate with each other over any network connection, such as Token Ring or Ethernet instead of, or in addition to Fibre Channel, or over combinations of different network connections. Fibre Channel is a standard that combines the speed of channel-based transmission schemes and the flexibility of network-based transmission schemes and allows multiple initiators to communicate with multiple targets over a network, where the initiator and the target may be any device coupled to the network. Fibre Channel is typically implemented using a fast transmission media such as optical fiber cables, and is thus a popular choice for storage system networks where large amounts of data are transferred. Moreover, aspects of the present invention may also be used in bus topologies, such as SCSI or parallel SCSI.

According to various embodiments and aspects of the present invention, there is provided a virtual removable media library back-up storage system that may use one or more disk arrays to emulate a removable media based storage system. Using embodiments of the invention, the nodes 102 may back-up data onto the data storage device 106 using the same back-up/restore application as would have been used to back-up the data onto removable media (such as tapes, magnetic disks, optical disks, etc.), without a user having to make any modifications or adjustments to the existing back-up procedures or having to purchase a new back-up/restore application. In one exemplary embodiment, the removable media that are emulated are tapes, and the back-up storage system of the invention emulates a tape library system including tapes and the robotic mechanism used to handle tapes in a conventional tape library system. The data that may be backed-up and restored using embodiments of the invention may be organized into various data objects. These data objects may include any structure into which data may be stored. A non-limiting list of exemplary data objects includes bits, bytes, data files, data blocks, data directories, back-up data sets and virtual cartridges.

The distributed garbage collection data structure 104 is a data structure that facilitates identification of unusable allocated memory. While the data structure 104 is described below with respect to certain features and aspects, one skilled in the art can appreciate that the data structure 104 can be arranged as any number and/or type of data structure(s) to accomplish proper identification of "garbage" memory. For example, the data structure 104 can include one data structure or a plurality of data structures. A non-limiting list of data structures can include data arrays, linked lists, queues, and/or other structures sufficient to hold identifying information of allocated memory. The information can be stored in a database (e.g., the data structures are data fields of a database table), such as, for example, relational database management systems (RDBMS) and object database management systems (ODBMS). For example, the distributed garbage collection data structure can be maintained as one or a plurality of database tables. The nodes 102 that do not house the distributed garbage collection data structure (nodes 102B through nodes 102N) can remotely communicate with the node containing the distributed garbage collection data structure (node 102A) to access the distributed garbage collection data structure. For example, node 102B can transmit signals to node 102A to insert data into the distributed garbage collection data structure 104, transmit signals to node 102A to receive copies of data in the distributed garbage collection data structure, etc.

FIG. 2A is a block diagram of an exemplary distributed garbage collection data structure 200A for deleting unused data objects according to the present invention. The garbage collection data structure (herein referred to as the "GC data structure") 200A includes data structure one 202, data structure two 204, and data structure three 206. As indicated by the box 208, data structure two 204 and data structure three 206 could be combined into a single data structure. Further, in some embodiments, data structure one 202, data structure two 204 and data structure three 206 could be combined into a single data structure. Data structure one 202 includes object ID 3 202A (the object ID for data object three). Data structure two 204 includes object ID 1 204A (the object ID for data object one), object ID 2 204B (the object ID for data object two), object ID 29 204C (the object ID for data object twenty-nine), and object ID 30 204D (the object ID for data object thirty). Data structure three 206 includes reference 1→2 206A (a reference from data object one, the data object referred to by object ID 1 204A, to data object two, the data object referred to by object ID 2 204B) and reference 2→29 206B (a reference from data object two, the data object referred to by object ID 1 204B, to data object twenty-nine, the data object referred to by object ID 29 204C).

Data structure one 202 stores one or more object identifiers for transient objects that are created. For example, the object identifiers can be unique object identifiers (IDs), where each newly created object is assigned an object ID. The object IDs stored in data structure 202 represent a data object about to be created but not yet assigned any references from other data objects. For example, when node 102 executes a set of instructions configured to create a new data object, node 102 adds the object ID for the data object to be created to data structure one 202. Data structure one 202 prevents data objects associated with the object IDs from being deleted during creation of the data object but before one or more references are created to the data object, as will be explained in further detail below with reference to FIGS. 4-5.

Data structure two 204 and data structure three 206 store data indicative of one or more objects allocated in the memory of the data storage device 106. Data structure two 204 stores one or more object IDs. Each object ID represents a created data object (e.g., a data object created by a node 102). An object ID within data structure two 204 represents, for example, a created data object. An object ID within data structure two 204 may have zero or more references to it (e.g., from other data object(s) and/or program(s)). Data structure three 206 includes one or more references to created data objects. The references can be, for example, individual reference entries (e.g., ref 1→2 206A, which is indicative of a single reference from data object one to data object two). In some examples, the references can be a graph (e.g., a tree-like structure where the leaves of the graph represent data objects and each branch represents a reference between the two associated leaves of the branch).

While various object numbers, object ID numbers and reference numbers are used in FIGS. 2A-2E, these are for exemplary purposes only. Any type and/or combination of identifiers can be used without departing from the spirit of this invention (e.g., numbers, letters, alphanumeric identifiers, symbols, etc.).

FIG. 2B is a block diagram of the exemplary distributed GC data structure 200B of FIG. 2A for deleting unused data objects according to the present invention. Like FIG. 2A, the GC data structure 200B includes data structure one 202, data structure two 204, and data structure three 206. Data structure one 202 includes object ID 3 202A (the object ID for data object three). Data structure two 204 includes object ID 1 204A (the object ID for data object one), object ID 2 204B (the object ID for data object two), object ID 29 204C (the object ID for data object twenty-nine), and object ID 30 204D (the object ID for data object thirty). Data structure three 206 includes reference 1→2 206A (a reference from data object one, the data object referred to by object ID 1 204A, to data object two, the data object referred to by object ID 2 204B) and reference 2→2 206B (a reference from data object two, the data object referred to by object ID 1 204B, to data object twenty-nine, the data object referred to by object ID 29 204C). In FIG. 2B, data structure two 204 also includes object ID 3 204E (the object ID for data object three).

FIG. 2C is a block diagram of the exemplary distributed GC data structure 200C of FIGS. 2A and 2B for deleting unused data objects according to the present invention. Like FIG. 2A, the GC data structure 200C includes data structure one 202, data structure two 204, and data structure three 206. Data structure one 202 includes object ID 3 202A (the object ID for data object three). Data structure two 204 includes object ID 1 204A (the object ID for data object one), object ID 2 204B (the object ID for data object two), object ID 29 204C (the object ID for data object twenty-nine), and object ID 30 204D (the object ID for data object thirty). Data structure three 206 includes reference 1→2 206A (a reference from data object one, the data object referred to by object ID 1 204A, to data object two, the data object referred to by object ID 2 204B) and reference 2→29 206B (a reference from data object two, the data object referred to by object ID 1 204B, to data object twenty-nine, the data object referred to by object ID 29 204C). Like FIG. 2B, data structure two 204 also includes object ID 3 204E (the object ID for data object three). In FIG. 2C, data structure three 206 includes reference 2→3 206C (a reference from data object two, the data object referred to by object ID 1 204B, to data object three, the data object referred to by object ID 3 204E).

FIG. 2D is a block diagram of the exemplary distributed GC data structure 200D of FIGS. 2A-2C for deleting unused data objects according to the present invention. Like FIG. 2A, the GC data structure 200D includes data structure one 202, data structure two 204, and data structure three 206. Data structure two 204 includes object ID 1 204A (the object ID for data object one), object ID 2 204B (the object ID for data object two), object ID 29 204C (the object ID for data object twenty-nine), and object ID 30 204D (the object ID for data object thirty). Data structure three 206 includes reference 1→2 206A (a reference from data object one, the data object referred to by object ID 1 204A, to data object two, the data object referred to by object ID 2 204B) and reference 2→29 206B (a reference from data object two, the data object referred to by object ID 1 204B, to data object twenty-nine, the data object referred to by object ID 29 204C). Like FIG. 2B, data structure two 204 also includes object ID 3 204E (the object ID for data object three). Like FIG. 2C, data structure three 206 includes reference 2→3 206C (a reference from data object two, the data object referred to by object ID 1 204B, to data object three, the data object referred to by object ID 3 204E). In FIG. 2D, data structure one 202 no longer includes object ID 3 202A (the object ID for data object three) as was in FIGS. 2A-2C.

Figure 2E:
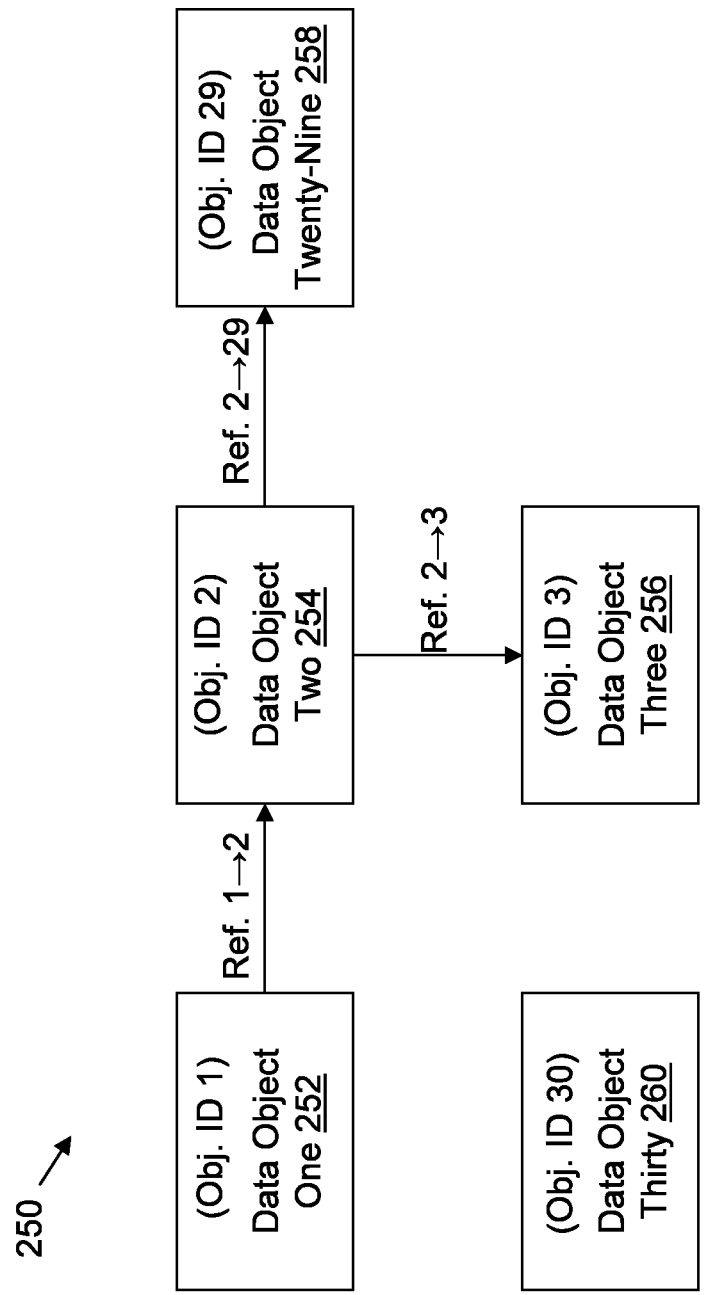
FIG. 2E is a block diagram of an exemplary graph for the data objects represented by the distributed garbage collection data structure of FIG. 2C-2D, according to the present invention.

FIG. 2E is a block diagram of an exemplary graph 250 for the data objects represented by the distributed garbage collection data structure in FIGS. 2C-2D, according to the present invention. Graph 250 includes data object one 252 (which is identified by object ID 1), data object two 254 (which is identified by object ID 2), data object three 256 (which is identified by object ID 3), data object twenty-nine 258 (which is identified by object ID 29), and data object thirty 260 (which is identified by object ID 30). Data object one 252 references data object two 254, as shown with reference (Ref.) 1→2. Data object two 254 references both data object three 256, as shown with reference 2→3, and data object twenty-nine 258, as shown with reference 2→29. Data object thirty 260 (which is identified by object ID 30) does not have any references to it. Therefore, data object thirty 260 should be garbage collected during the next iteration of the garbage collection cycle.

Referring to FIG. 2A, the GC data structure 200A represents the graph in FIG. 2E without data object three 256 or reference 2→3 (e.g., neither data object three 256 or its reference from data object two 254 have been created yet). Referring to FIG. 2B, the GC data structure 200B represents the graph in FIG. 2E with data object three 256 but without reference 2→3 (e.g., the reference from data object two 254 to data object three 256 has not been created). Referring to FIGS. 2C and 2D, both GS data structures 200C and 200D represent the graph in FIG. 2E with both data object three 256 and reference 2→3. The difference between FIGS. 2C and 2D is only that GC data structure 200C includes the object ID 3 202A in data structure one 202, but not in GC data structure 200D. There is no difference with the graph represented by data structures 200C and 200D.

Figure 3:
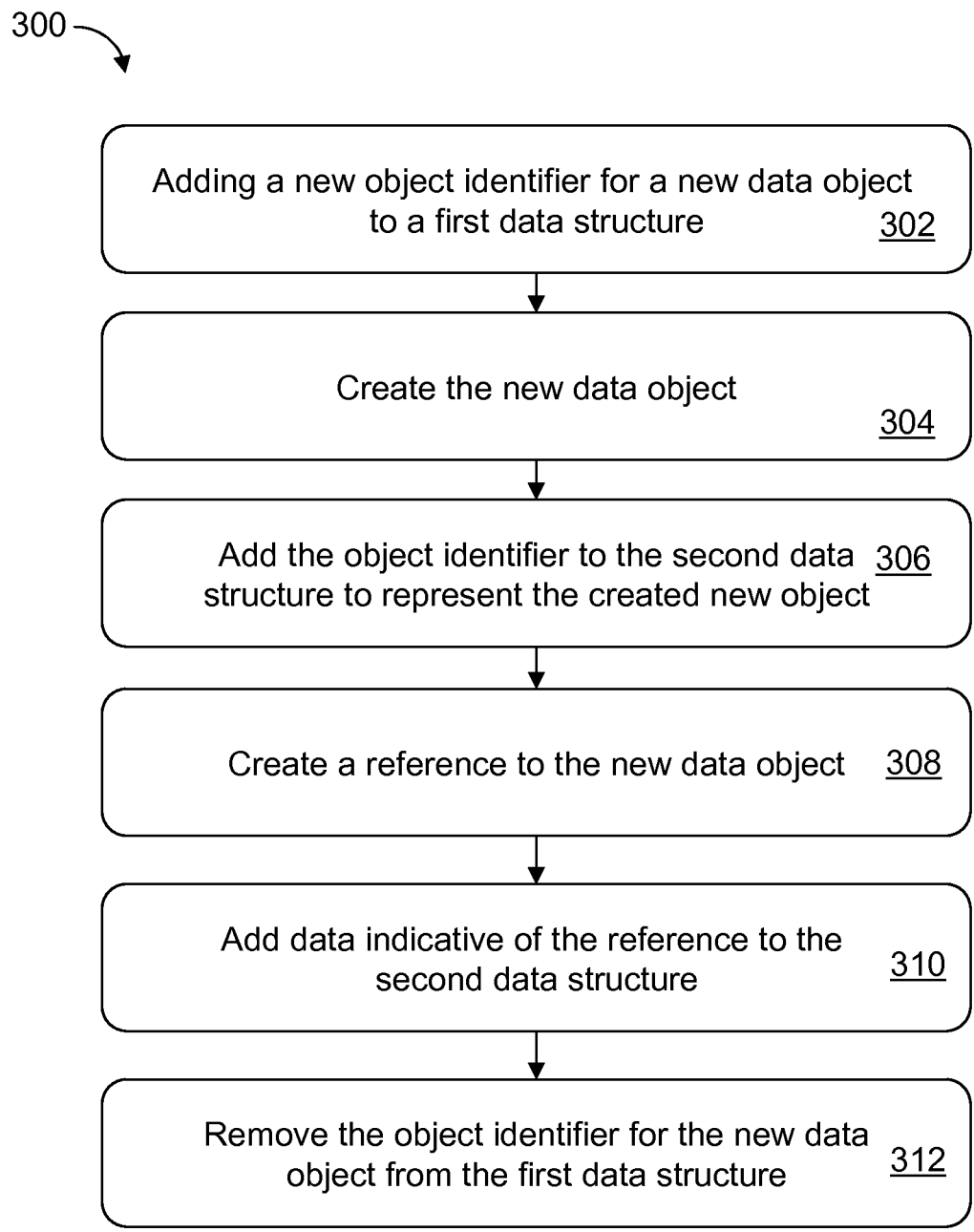
FIG. 3 is an exemplary method for creating a new data object in the distributed system according to the present invention.

FIG. 3 is an exemplary method 300 for creating a new data object in the distributed system according to the present invention. FIG. 3 is explained below in conjunction with FIGS. 2A-2D. The new data object to be created (e.g., by a node 102 of FIG. 1) is object three, which is associated with object ID 3. Referring to FIG. 2A, at step 302 the node 102 adds object ID 3 302A to data structure one 202. At step 304, the node 102 creates the new data object (e.g., in data storage device 106 of FIG. 1). Referring to FIG. 2B, at step 306 the node 102 adds the object ID 3 204E to the second data structure 208 (e.g., to data structure two 204) to represent the created new object three. At step 308, the node 102 creates a reference to the new data object three. Referring to FIG. 2C, at step 310 the node 102 adds data indicative of the reference (e.g., the node 102 adds reference 2→3 206C) to the second data structure 208 (e.g., to data structure three 206). Referring to FIG. 2D, at step 312, the node 102 removes the object ID 3 202A for the new data object three from data structure one 202.

Referring to step 302, the node 102 adds object ID 3 302A to data structure one 202 first before adding data to data structure 208. Advantageously, when the garbage collection routine executes (e.g., on a node 102) and determines candidate data objects for reclamation (or deletion), the object IDs listed in data structure one 202 prevent the associated objects from being deleted after creation (e.g., after their addition to data structure two 204) but before any references are created to the objects. This is explained in further detail below with reference to FIGS. 4-5.

Referring to step 304, as shown in FIG. 2E data object three 256 is created (but reference 2→3 has not yet been created). As described above, the created data object can be any type of object in memory. As an illustrative example, the data objects being created and garbage collected in the distributed system 100 are files stored on disk(s) in the data storage device 106. The garbage collection routine can be executed by one or more of the nodes 102. Therefore, the nodes 102 use the GC data structure 104 to keep track of the files being used in the distributed system 100. Once a file can no longer be accessed by the nodes 102, the garbage collection routine deletes the file from the data storage device 106.

For example, in an exemplary embodiment the data storage device 106 provides the actual storage space for back-up data from the nodes 102, which are running a back-up/restore application. However, the data storage device 106 (and/or the nodes 102) may also include software and additional hardware that emulates a removable media storage system, such as a tape library, such that, to the back-up/restore application running on the nodes 102 (or remote host machine(s) in communication with the data storage device 106), it appears as though data is being backed-up onto conventional removable storage media. Thus, the data storage device 106 stores files which represent, for example, virtual or emulated removable storage media such as tapes. This "emulated media" may include one or more pointers to other data files.

For example, the backup application may include a synthetic full back-up application and an end-user restore application. In brief overview, the synthetic full back-up application is capable of creating a synthetic full back-up data set from one existing full back-up data set and one or more incremental back-up data sets. A synthetic full-backup data set can include data from the full back-up data set and the one or more incremental backup data sets such that the synthetic full-backup data set includes the same information as if a full backup was performed when the most recent incremental backup data set was recorded. The synthetic full backup data set may obviate the need to perform periodic (e.g., weekly) full back-ups, thereby saving considerable time and network resources.

In some examples, the synthetic full-backup data file may include a combination of both pointers to backed-up data files and actual stored backed-up data files. For example, the synthetic full-backup data file includes pointers that point to locations of data files (e.g., the latest versions of the files) in the existing full back-up data file. The synthetic virtual cartridge may also include data containing actual data files copied from, for example, the incremental data set(s). Once the actual data files are copied from the incremental data set(s), the data stored in the incremental data set(s) becomes redundant. In this manner, one or more incremental back-up data sets can be deleted after the synthetic full backup data set 276 has been created, thereby saving storage space.

Referring to step 306, the object ID 3 204E is added to the data object "graph" (or representation of the data files) in the data storage device 106. Advantageously, the nodes 102 can determine that data object three is in the data storage device 106. However, the node 102 still keeps the object ID 3 202A in data structure one 202 because there are not yet any references to data object three (e.g., reference 2→3 in FIG. 2E has not yet been created). This is described in further detail below with respect to FIGS. 4-5.

At step 308, the node 102 creates a reference to the new data object three (e.g., node 102 creates reference 2→3 in FIG. 2E). Referring to steps 310 and 312, for example, once the data indicative of the reference is added to second data structure 208, there is no longer a risk that the garbage collection routine would inadvertently release (or delete) the data object after its creation but before any references are assigned to the data object (e.g., which is what data structure one 202 prevents). Therefore, the object ID for the data object can be deleted from data structure one 202.

Figure 4:
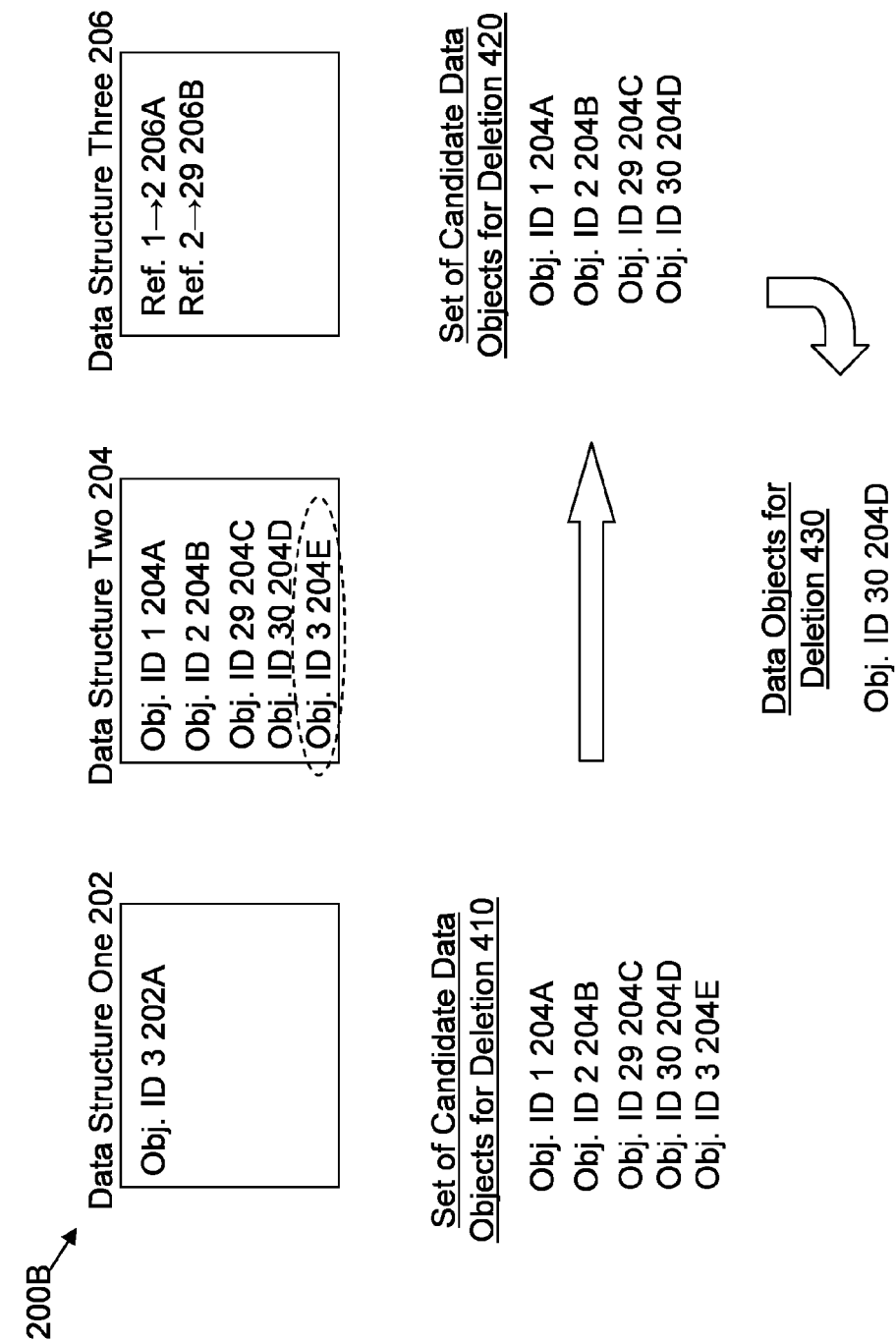
FIG. 4 is a diagram showing the identification of data objects for deletion according to the present invention.

FIG. 4 is a diagram 400 showing the identification of data objects for deletion according to the present invention. FIG. 4 includes the distributed garbage collection data structure 200B of FIG. 2B. As shown in the GC data structure 200B, the object ID 3 for the data object 3 is in both data structure one 202 (e.g., as obj. ID 3 202A) and data structure two 204 (obj. ID 204E), but there are no references to object three in the data structure three 206. Referring to FIG. 2E, GC data structure 200B is indicative of data object three 256 being created, but not yet having any references from other data objects (e.g., node 102 has not yet created ref 2→3). Therefore, if the garbage collection process runs during the state shown in the GC data structure 200B, without data structure one 202, there would be no way to determine that data object three 256 is in the process of being created. For example, data object thirty 260 was already created and no longer has any references to it, and therefore is a candidate for deletion. However, data object three 256 is in the process of creation but does not yet have reference 2→3 created. The garbage collection process cannot differentiate between data object thirty 260 and data object three 256 using just data structures two 204 and three 206. However, the garbage collection process can use data structure one 202, which includes object ID 3 202A, do determine that data object three 256 is being created but has not yet had any references created to it. This is explained in further detail below.

Diagram 400 includes a set of candidate data objects for deletion 410. The set of candidate data objects for deletion 410 includes object ID 1 204A, object ID 2 204B, object ID 29 204C, object ID 30 204D, and object ID 3 204E (e.g., the data object identifiers from data structure two 204). Diagram 400 includes a set of candidate data objects for deletion 420, which includes object ID 1 204A, object ID 2 204B, object ID 29 204C, and object ID 30 204D (it does not include object ID 3 204E, which was in the set 410). Diagram 400 includes data objects for deletion 430, which includes object ID 30 204D.

Figure 5:
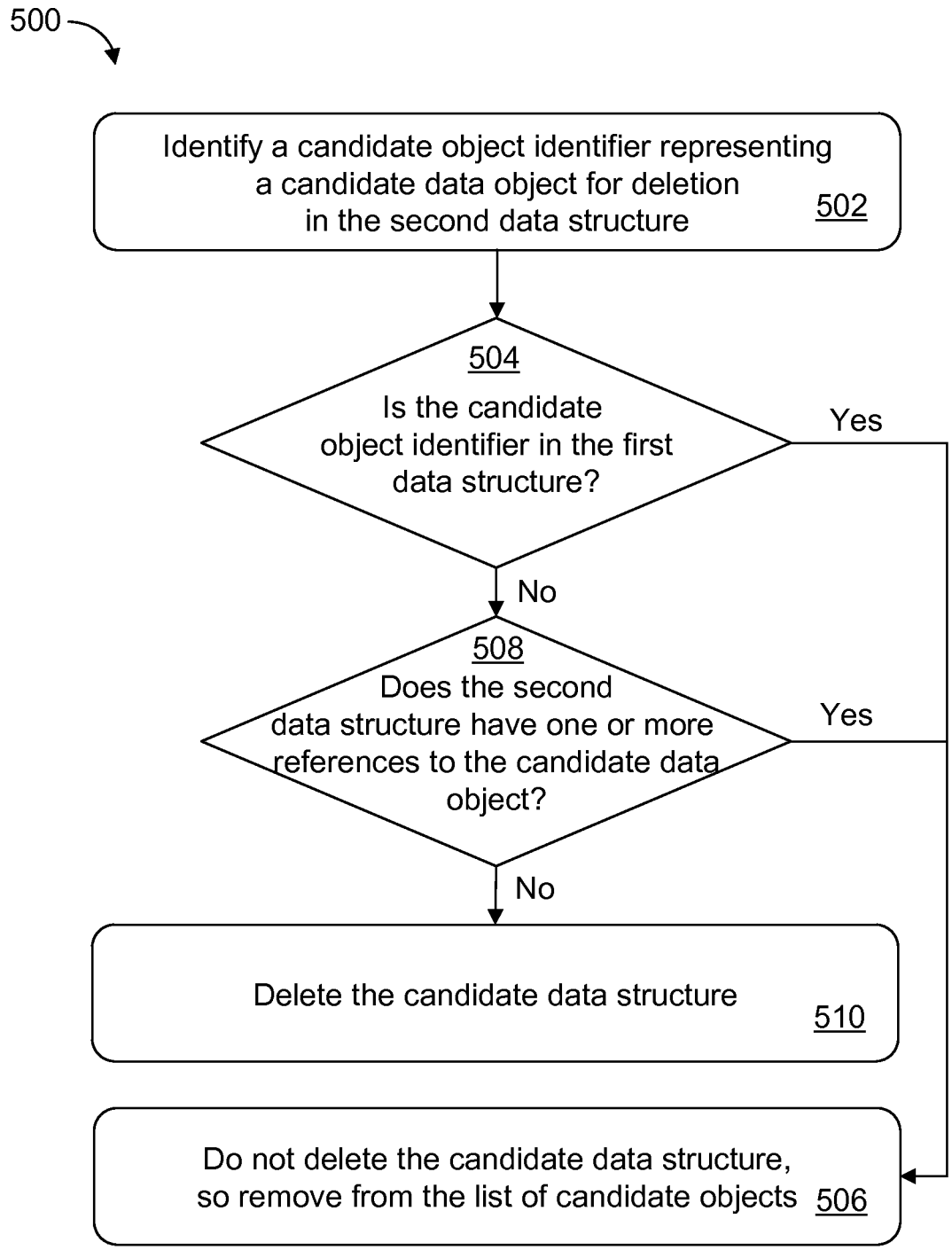
FIG. 5 is an exemplary method for identifying candidate data objects for deletion according to the present invention.

FIG. 5 is an exemplary method 500 for identifying candidate data objects for deletion according to the present invention. The garbage collection algorithm determines one or more unused data objects based on the first data structure and the second data structure (e.g., based on data structure one 202 and data structure 208), and deletes the one or more unused data objects. Method 500 will be explained in conjunction with FIG. 4. At step 502 the garbage collection process (e.g., running on a node 102) identifies one or more candidate object identifiers (e.g., object ID 204A, object ID 2 204B, object ID 29 204C, object ID 30 204D, and object ID 3 204E) that represent one or more candidate data objects for deletion in the second data structure (e.g., in data structure two 204 of data structure 208). The garbage collection process determines whether each candidate object identifier is being used. At step 504, the garbage collection process determines if the candidate object identifier is in data structure one 202. If the candidate object identifier is in data structure one 202, the method proceeds to step 506, and the garbage collection process does not delete the candidate data structure, removing it from the set of candidate data objects for deletion 410. If the candidate object identifier is not in data structure one 202, the method proceeds to step 508. At step 508, the garbage collection process determines whether the second data structure 208 has one or more references to the candidate data object. If the second data structure 208 has one or more references to the candidate data object, the method proceeds to step 506. If the second data structure 208 does not have one or more references to the candidate data object, the method proceeds to step 510. At step 510, the garbage collection process deletes the candidate data structure.

Referring to step 502, the garbage collection process searches through the list of object IDs in the data structure two 204. In some embodiments, the garbage collection process creates a copy of one or more of the data structures. For example, the garbage collection process can copy the second data structure 208 (e.g., data structure two 204 and data structure three 206). The garbage collection process can determine the one or more unused data objects based on the first data structure 202 and the copy of the second data structure 208. In some embodiments, the garbage collection process copies all of the data structures (e.g., data structure one 202 and data structure 208). Advantageously, because the garbage collection process operates on one or more copied data structures, the garbage collection process operates on a static subset of the whole system (e.g., nothing can be added to the copied data structures, such that data objects created while the garbage collection process is running will be deliberately missed). The garbage collection process does not need to be configured to determine all data objects for deletion on each execution. Advantageously, by working on copied data structures (e.g., subsets of the entire lists), subsequent manipulation of the lists during garbage collection does not complicate the collection process.

Referring to step 504, the garbage collection process removes each object ID in the set of candidate data objects for deletion 410 to generate the set of candidate data objects for deletion 420. The garbage collection process iterates through each object ID (e.g., object ID 204A, object ID 204B, etc.) in the set of candidate data objects for deletion 410, and removes each object ID that is also in the data structure one 202. For example, when the garbage collection process checks object ID 3 204E, the process determines that object ID 3 202A is in data structure one 202. The garbage collection process therefore determines that object ID 3 204E is being created and therefore is not a candidate for garbage collection. The garbage collection process removes object ID 3 204E from the set of candidate data objects for deletion 410. The set of candidate data objects for deletion 420 will, therefore, not have any object IDs that appear in the data structure one 202.

If the candidate object identifier is in data structure one 202, the method proceeds to step 506, and the garbage collection process does not delete the candidate data structure, removing it from the set of candidate data objects for deletion 410.

Referring to step 508, the garbage collection process removes any candidate data objects that have one or more references in data structure three 206. Referring to FIG. 4, reference 1→2 206A shows that data object one includes a reference to data object two. Therefore, the object IDs for data objects one and two (e.g., object ID 1 204A and object ID 2 204B) are removed from the set of candidate data objects for deletion 420. Similarly, reference 2→29 206B shows that data object two also references data object twenty-nine. Therefore, the object IDs for data objects one and two (e.g., object ID 1 204A and object ID 2 204B) are removed from the set of candidate data objects for deletion 420.

Referring to step 510, the garbage collection process deletes the list of data objects for deletion 430. As shown through steps 502-508, the list of data objects for deletion 430 only includes data objects that both (1) are not in the process of being created, and therefore risking the existence of the object in data structure two 204 but not references in 206, and (2) that do not have any other references (e.g., in data structure three 206). Referring to FIG. 2E, the only data object that meets these criteria is data object thirty 260, which is reclaimed for reuse by the distributed system. The remaining data objects in FIG. 2E have one or more references to/from other data objects, preventing their deletion. While the references have been described as references from objects to objects, the references can be to and/or from any type of data structure or process. For example, a process identifier for a process running on a node 102 can have a reference to a data object. It does not matter what the references are to and/or from, but rather that the references are stored in the GC data structure to prevent deletion of data objects that will be accessed in the future.

In some embodiments, locks can be used to perform garbage collection. Locks can be used if processes other than the garbage collector are authorized to delete (reclaim) data objects. For example, garbage collection with locks could be performed by: (1) acquiring a lock of a data object, (2) determining the data object is not in the transient list (e.g., data structure one 202) and that no references exist to the data object (e.g., using data structure 208), (3) deleting the object, and (4) releasing the lock. For example, node 102 can only acquire a lock for a data object if no other programs have a lock for the data object (e.g., the lock prevents more than one program from manipulating the data object). For example, other programs attempting to use the data object would not be able to acquire a lock to the object since the node 102 already acquired the lock (e.g., only one lock can be acquired for a particular data object). Therefore, the other programs would wait (or pause) until the lock for the data object is freed before further manipulating the data object, or skip the data object and move to a next data object. Advantageously, the above described method can operate without using locks. The method 500 described in conjunction with FIG. 5 can ensure that the garbage collection routine will not identify any in-use data objects based on the use of the distributed garbage collection data structure 104 (e.g., how IDs and references are inserted into data structures one 202 and 208, and how the garbage collection method makes determinations based on the data structures 202 and 208).

The distributed garbage collection data structure can be designed to tolerate extra (garbage) data within its data structures, as long as it does not build up excessively. In some embodiments, the object IDs in the transient list of data objects (e.g., data structure one 202) can be garbage collected to avoid useless object IDs from remaining in the transient list indefinitely. For example, each object ID in the transient list can be associated with a process identifier (PID). The garbage collection system can periodically verify each object ID in the transient list of data objects is associated with an active PID. If not, then the object ID can be removed. Advantageously, the transient list can be actively maintained to ensure there is no stale information in the list. Similar methods can be applied to other data structures in the distributed garbage collection data structure.

The above-described techniques can be implemented in digital and/or analog electronic circuitry, or in computer hardware, firmware, software, or in combinations thereof. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

Having thus described several aspects of at least one example of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method for deleting data objects in a distributed computer system, the method comprising:
   creating, by a computer, a first data structure configured to store one or more object identifiers;
   creating, by the computer, a second data structure configured to store at least one object identifier and one or more references to objects;
   creating a copy of the second data structure;
   storing, by the computer, the one or more object identifiers in the first data structure, each object identifier of the one or more object identifiers representing a corresponding data object about to be created but not yet assigned any references from other data objects;
   identifying, within the copy of the second data structure, at least one first candidate object identifier representing at least one first candidate data object identified for deletion, at least one second candidate object identifier representing at least one second candidate data object identified for deletion and at least one third candidate object identifier representing at least one third candidate data object identified for deletion;
   determining the at least one first candidate data object is being used;
   in response to determining the at least one first candidate data object is being used, not deleting the at least one first candidate data object;
   determining the at least one second candidate object identifier is stored within the first data structure;
   in response to determining the at least one second candidate object identifier is stored within the first data structure, not deleting the at least one second candidate data object; and
   deleting the at least one third candidate data object.

2. The method of claim 1 further comprising creating a new data object for a distributed system, comprising:
   adding an object identifier representing the new data object to the first data structure;
   creating the new data object;
   adding the object identifier to the second data structure;
   creating a reference to the new data object;
   adding data indicative of the reference to the second data structure; and
   removing the object identifier from the first data structure.

3. The method of claim 2 further comprising:
   acquiring a lock for the new data object prior to creating the reference, wherein the lock prevents any other programs from manipulating the new data object;
   and
   releasing the lock for the new data object after adding the data indicative of the reference to the second data structure.

4. The method of claim 1 wherein determining the at least one first candidate data object is being used comprises determining the second data structure comprises one or more references to the at least one first candidate data object.

5. The method of claim 1 further comprising determining the at least one third candidate data object is an unused data object.

6. The method of claim 5 wherein determining the at least one third candidate data object is an unused data object comprises determining the at least one third candidate object identifier is not in the first data structure and the second data structure does not comprise one or more references to the at least one third candidate data object.

7. The method of claim 1 wherein deleting the at least one third candidate data object comprises:
   acquiring at least one lock for the at least one third candidate data object, wherein the at least one lock prevents any other programs from manipulating the at least one third candidate data object;
   deleting the at least one third candidate data object;
   removing the at least one third candidate object identifier from the second data structure; and
   releasing the at east one lock for the at least one third candidate data object.

8. The method according to claim 1, wherein creating the first data structure includes creating the first data structure on a node separate from a data storage device storing the at least one first candidate data object, the at least one second candidate data object, and the at least one third candidate data object.

9. An apparatus for deleting data objects in a distributed computer system, the apparatus comprising:
   a memory configured to store a first data structure configured to store one or more object identifiers and a second data structure configured to store at least one object identifier and one or more references to objects;
   a processor in communication with the memory configured to:
      create the first data structure;
      create the second data structure;
      create a copy of the second data structure;
      store the one or more object identifiers in the first data structure, each object identifier of the one or more object identifiers representing a corresponding data object about to be created but not yet assigned any references from other data objects;
      identify, within the copy of the second data structure, at least one first candidate object identifier representing at least one first candidate data object identified for deletion, at least one second candidate object identifier representing at least one second candidate data object identified for deletion, and at least one third candidate object identifier representing at least one third candidate data object identified for deletion;

determine the at least one first candidate data object is being used;

in response to determining the at least one first candidate data object is being used, not deleting the at least one first candidate data object;

determine the at least one second candidate object identifier is stored within the first data structure;

in response to determining the at least one second candidate object identifier is stored within the first data structure, not deleting the at least one second candidate data object; and delete the at least one third candidate data object.

10. The apparatus of claim 9 wherein the processor is further configured to create the new data object for the distributed system by at least in part:

adding an object identifier representing the new data object to the first data structure;

creating the new data object;

adding the object identifier to the second data structure;

creating a reference to the new data object;

adding data indicative of the reference to the second data structure; and removing the object identifier from the first data structure.

11. The apparatus of claim 9 wherein the processor is configured to determine the at least one first candidate data object is being used by, at least in part, determining the second data structure comprises one or more references to the at least one first candidate data object.

12. The apparatus of claim 9 wherein the processor is further configured to determine the at least one third candidate data object is an unused data object.

13. The apparatus of claim 12 wherein the processor is configured to determine the at least one third candidate data object is an unused data object by, at least in part, determining the at least one third candidate object identifier is not in the first data structure and the second data structure does not comprise one or more references to the at least one third candidate data object.

14. A computer program product, tangibly embodied in a non-transitory computer readable medium, the computer program product including instructions being configured to cause a data processing apparatus to execute a process for deleting data objects, the process including:

creating a first data structure configured to store one or more object identifiers;

creating a second data structure configured to store at least one object identifier and one or more references to objects;

creating a copy of the second data structure;

storing the one or more object identifiers in the first data structure, each object identifier of the one or more object identifiers representing a corresponding data object about to be created but not yet assigned any references from other data objects;

identifying, within the copy of the second data structure, at least one first candidate object identifier representing at least one first candidate data object identified for deletion, at least one second candidate object identifier representing at least one second candidate data object identified for deletion, and at least one third candidate object identifier representing at least one third candidate data object identified for deletion;

determining the at least one first candidate data object is being used;

in response to determining the at least one first candidate data object is being used, not deleting the at least one first candidate data object;

determining the at least one second candidate object identifier is stored within the first data structure;

in response to determining the at least one second candidate object identifier is stored within the first data structure, not deleting the at least one second candidate data object; and deleting the at least one third candidate data object.

15. The computer program product of claim 14, wherein the instructions are further configured to create a new data object for a distributed system by at least in part:

adding an object identifier representing the new data object to the first data structure;

creating the new data object;

adding the object identifier to the second data structure;

creating a reference to the new data object;

adding data indicative of the reference to the second data structure; and removing the object identifier from the first data structure.

16. The computer program product of claim 15, wherein the instructions are further configured to:

acquire a lock for the new data object prior to creating the reference, wherein the lock prevents any other programs from manipulating the new data object; and release the lock for the new data object after adding the data indicative of the reference to the second data structure.

17. The computer program product of claim 14 wherein the instructions configured to determine the at least one first candidate data object is being used include instructions configured to determine the second data structure comprises one or more references to the at least one first candidate data object.

18. The computer program product of claim 14, wherein the instructions are further configured to determine the at least one third candidate data object is an unused data object.

19. The computer program product of claim 18 wherein the instructions configured to determine the at least one third candidate data object is an unused data object include instructions configured to determine the at least one third candidate object identifier is not in the first data structure and to determine the second data structure does not comprise one or more references to the at least one third candidate data object.

20. The computer program product of claim 14 wherein the instructions configured to delete the at least one third candidate data object include instructions configured to:

acquire at least one lock for the at least one third candidate data object, wherein the at least one lock prevents any other programs from manipulating the at least one third candidate data object;

delete the at least one third candidate data object;

remove the at least one third candidate object identifier from the second data structure; and release the at least one lock for the at least one third candidate data object.

* * * * *

UNITED STATES PATENT AND TRADEMARK OFFICE
CERTIFICATE OF CORRECTION

| | | |
|---|---|---|
| PATENT NO. | : 8,527,558 B2 | Page 1 of 1 |
| APPLICATION NO. | : 12/882885 | |
| DATED | : September 3, 2013 | |
| INVENTOR(S) | : Stefan Merrill King et al. | |

It is certified that error appears in the above-identified patent and that said Letters Patent is hereby corrected as shown below:

In the Claims:

Column 16, Claim 7, Line 36, delete "east", and insert --least--.

Signed and Sealed this
Fourth Day of March, 2014

Michelle K. Lee
*Deputy Director of the United States Patent and Trademark Office*